US012670193B2

(12) United States Patent
Mai et al.

(10) Patent No.: US 12,670,193 B2
(45) Date of Patent: Jun. 30, 2026

(54) SPARSE EMBEDDING INDEX FOR SEARCH

(71) Applicant: ADOBE INC., San Jose, CA (US)

(72) Inventors: Tung Mai, San Jose, CA (US); Saayan Mitra, San Jose, CA (US); Ryan A. Rossi, San Jose, CA (US); Gaurav Gupta, Houston, TX (US); Anup Rao, San Jose, CA (US); Xiang Chen, Palo Alto, CA (US)

(73) Assignee: ADOBE INC., San Jose, CA (US)

( * ) Notice: Subject to any disclaimer, the term of this patent is extended or adjusted under 35 U.S.C. 154(b) by 366 days.

(21) Appl. No.: 17/527,001

(22) Filed: Nov. 15, 2021

(65) Prior Publication Data

US 2023/0153338 A1    May 18, 2023

(51) Int. Cl.
*G06F 16/3332* (2025.01)
*G06F 16/31* (2019.01)
*G06F 16/334* (2025.01)

(52) U.S. Cl.
CPC ........ *G06F 16/3338* (2019.01); *G06F 16/319* (2019.01); *G06F 16/325* (2019.01); *G06F 16/3347* (2019.01)

(58) Field of Classification Search
CPC .. G06F 16/3338; G06F 16/319; G06F 16/325; G06F 16/3347
See application file for complete search history.

(56) References Cited

U.S. PATENT DOCUMENTS 6,349,308 B1 * 2/2002 Whang ................. G06F 16/319
                                                707/999.005
2020/0265045 A1 * 8/2020 Tepper .................. G06N 20/00

OTHER PUBLICATIONS

Computer Science Stack Exchange; "data structures—Why is the inverted index called so and not simply index?"; https://cs.stackexchange.com/questions/130814/why-is-the-inverted-index-called-so-and-not-simply-index#:~:text=Then%2C%20the%20inverse%20mapping%20is,are%20probably%20querying%20an%20index. (Year: 2020).*
Stack Overflow; "What's the difference between an inverted index and a plain old index?"; Date: 2011-2017; https://stackoverflow.com/questions/7727686/whats-the-difference-between-an-inverted-index-and-a-plain-old-index (Year: 2017).*

* cited by examiner

*Primary Examiner* — Amanda L Willis
(74) *Attorney, Agent, or Firm* — Shook Hardy & Bacon L.L.P.

(57) ABSTRACT

A search system facilitates efficient and fast near neighbor search given item vector representations of items, regardless of item type or corpus size. To index an item, the search system expands an item vector for the item to generate an expanded item vector and selects elements of the expanded item vector. The item is index by storing an identifier of the item in posting lists of an index corresponding to the position of each selected element in the expanded item vector. When a query is received, a query vector for the item is expanded to generate an expanded query vector, and elements of the expanded query vector are selected. Candidate items are identified based on posting lists corresponding to the position of each selected element in the expand query vector. The candidate items may be ranked, and a result set is returned as a response to the query.

20 Claims, 8 Drawing Sheets

Step1.    Hash (Expand) it: $y = Hx$

Step2.    Sparsify: $y_s = Bin\ (topk(y\,))$

• $y_s$ is a sparse binary vector (<1% non zeros)

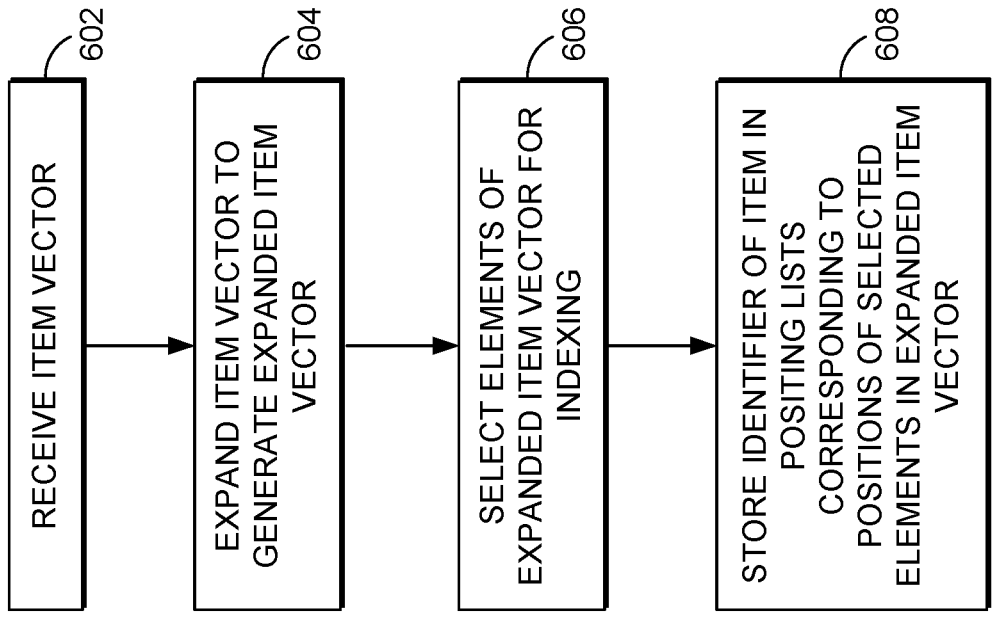
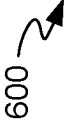
RECEIVE ITEM VECTOR — 602
EXPAND ITEM VECTOR TO GENERATE EXPANDED ITEM VECTOR — 604
SELECT ELEMENTS OF EXPANDED ITEM VECTOR FOR INDEXING — 606
STORE IDENTIFIER OF ITEM IN POSITING LISTS CORRESPONDING TO POSITIONS OF SELECTED ELEMENTS IN EXPANDED ITEM VECTOR — 608
600
FIG. 6.

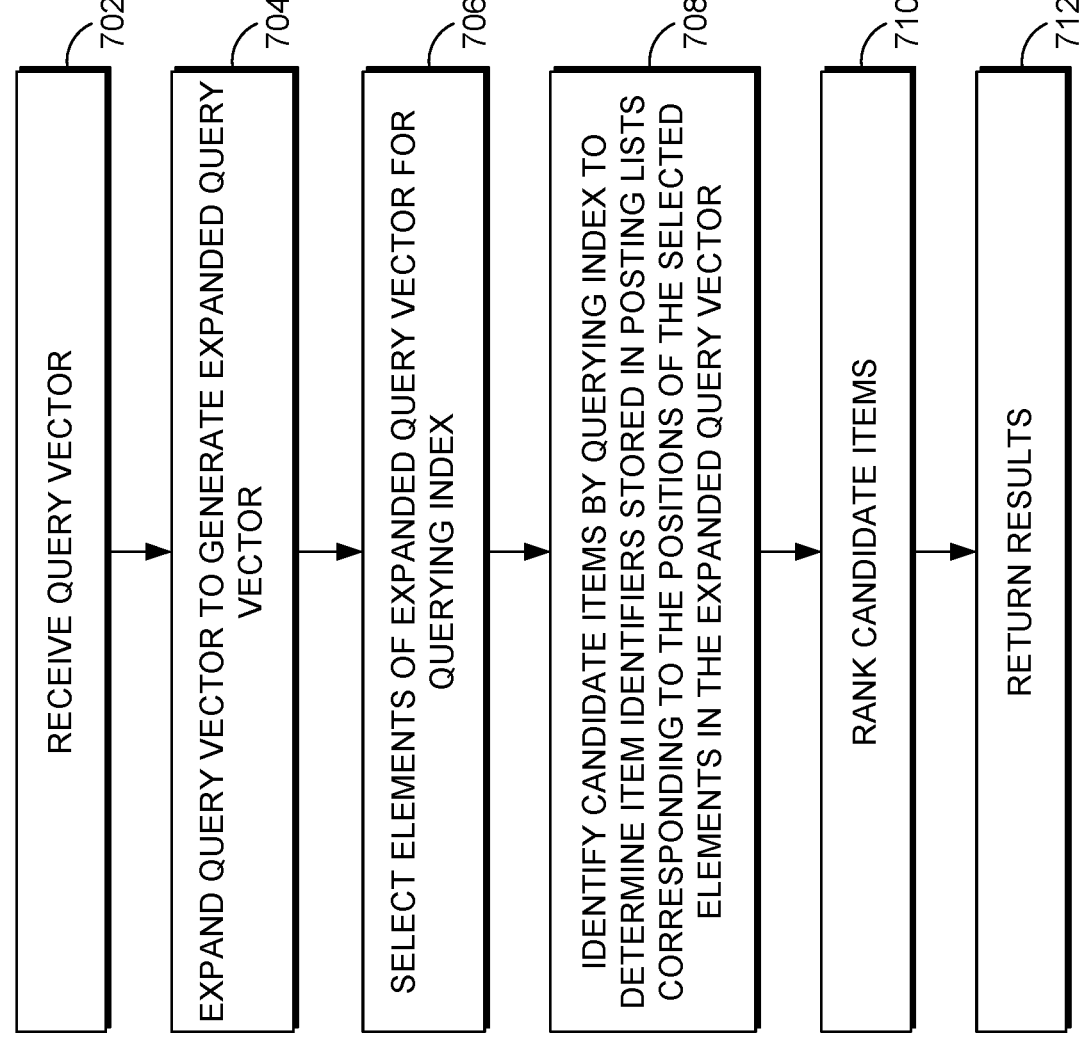

702 — RECEIVE QUERY VECTOR

704 — EXPAND QUERY VECTOR TO GENERATE EXPANDED QUERY VECTOR

706 — SELECT ELEMENTS OF EXPANDED QUERY VECTOR FOR QUERYING INDEX

708 — IDENTIFY CANDIDATE ITEMS BY QUERYING INDEX TO DETERMINE ITEM IDENTIFIERS STORED IN POSTING LISTS CORRESPONDING TO THE POSITIONS OF THE SELECTED ELEMENTS IN THE EXPANDED QUERY VECTOR

710 — RANK CANDIDATE ITEMS

712 — RETURN RESULTS

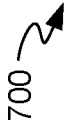

MEMORY 812

PROCESSOR(S) 814

PRESENTATION COMPONENT(S) 816

I/O PORT(S) 818

I/O COMPONENTS 820

POWER SUPPLY 822

810

800

SPARSE EMBEDDING INDEX FOR SEARCH

BACKGROUND

Search systems are powerful computer tools that facilitate quickly identifying items. In the broadest sense, a search system operates by receiving input (i.e., a query) and providing a result set identifying items responsive to the input. In some instances, items can be digital content, such as electronic documents (e.g., from productivity applications), web pages, images, audio content, video content, and the like. In other instances, items can be physical, such as products for sale on an e-commerce site or individuals on a social networking site. Recommender systems are one form of search in which items are recommended to a user. Such recommender systems have become ubiquitous and crucial for content discovery on various platforms like online retail, music, image search and video streaming.

SUMMARY

Embodiments of the present invention relate to, among other things, a search system that facilitates efficient and fast near neighbor search given item vector representations of items, regardless of item type or corpus size. The search system uses a search index that indexes items based on sparse representations of the items. Given an item vector for an item, the search system expands the item vector to generate an expanded item vector having a dimensionality greater than the dimensionality of the item vector. Elements of the expanded item vector are selected (e.g., the top k values of the expanded item vector), and the positions of the selected elements in the expanded item vector are used to index the item in the inverted index. In particular, the inverted index includes postings lists corresponding to each position of the expanded item vector. As such, an identifier of the item is stored in the posting list corresponding to the position of each selected element.

When a query is received, a query vector of the query is expanded to generate an expanded query vector having a dimensionality greater than the dimensionality of the query vector. Elements of the expanded query are selected (e.g., the top k values of the expanded query vector), and the positions of the selected elements in the expanded query vector are used to query the inverted index. In particular, candidate items are identified from the posting lists of the inverted index corresponding with the positions of the selected elements in the expanded query vector. The candidate items may be ranked, for instance, based on frequency with which each appears in the relevant posting lists and/or based on a distance/similarity of the query vector to item vectors of the candidate items. A result set is generated and provided in response to the query.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 6 is a flow diagram showing a method for indexing an item by generating a sparse representation of the item that can mapped to posting lists in an inverted index in accordance with some implementations of the present disclosure;

FIG. 7 is a flow diagram showing a method for using a sparse representation of a query to identify items in an index to return as results in accordance with some implementations of the present disclosure.

DETAILED DESCRIPTION

Definitions

Figure 1:
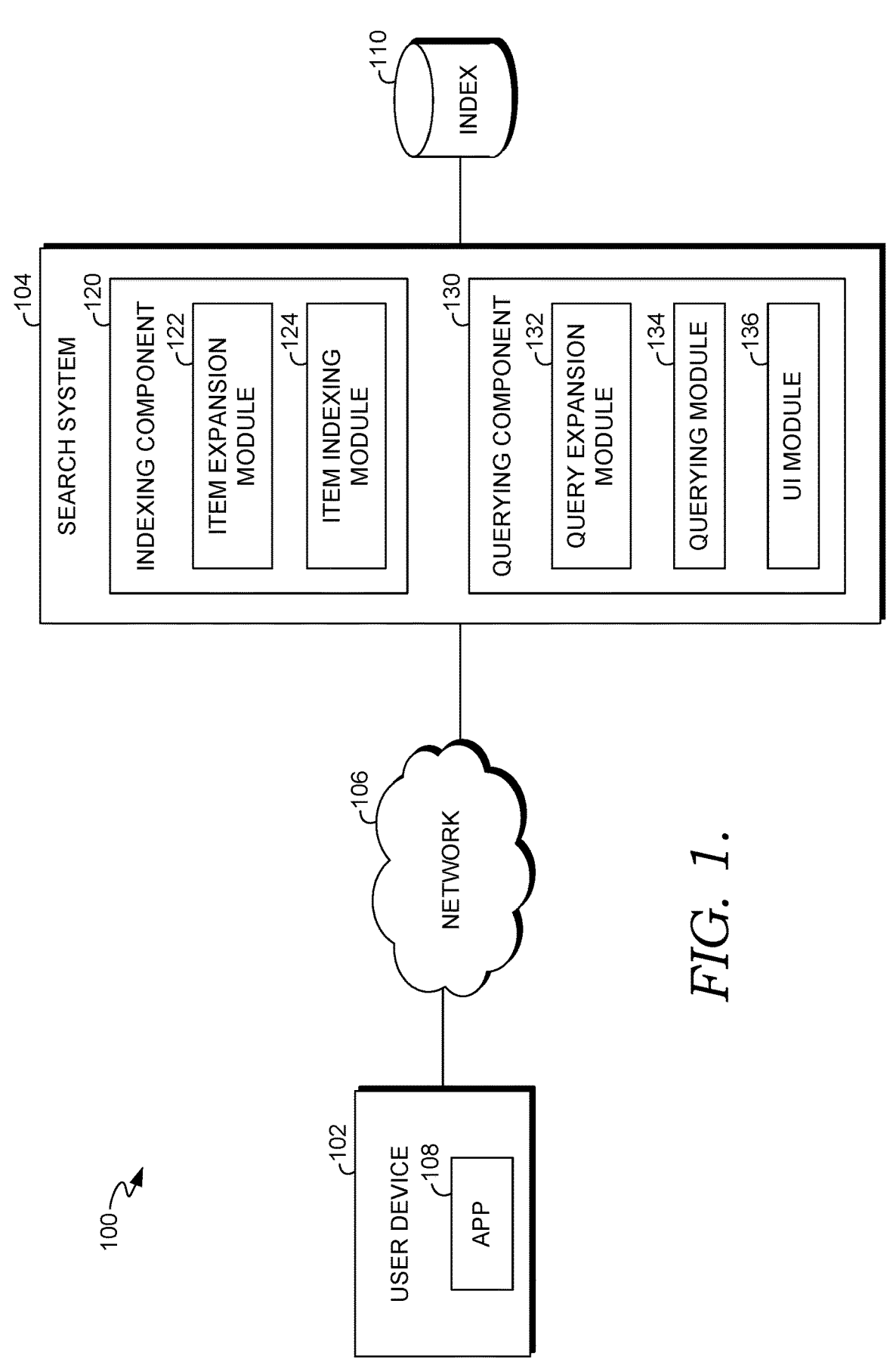
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, an "item" refers broadly to anything that can be identified in response to a query. In some instances, an item can be digital content, such as an electronic document (e.g., from a productivity application), web page, a product listing (e.g., on an e-commerce site), a movie, a song, a photograph, or any other digital content. The digital content item may comprise text, image, audio, video, or any combination thereof. In other instances, items can be physical, such as products for sale on an e-commerce site or individuals on social media sites.

An "item vector" is an array of values providing a representation of an item. Each value in an item vector comprises an element of the item vector. In some cases, an item vector may be an embedding generated by a neural network using information associated with the item. The information used to generate such an embedding may include the item itself (in the case of digital content) and/or information associated with the item, such as attributes of the item or information regarding user interactions with the item. The embedding may be a dense embedding having relatively smaller dimensionality (i.e., a smaller number of values/elements in the embedding).

An "expanded item vector" is an array of values generated by expanding an item vector, and in some instances, sparsifying the expanded item vector. In some instances, the expanded item vector may be generated by applying (i.e., multiplying) a matrix to a given item vector.

As used herein, an "inverted index" stores information for identifying items in response to a query. In accordance with some aspects of the technology described herein, an inverted index may comprise posting lists. Given expanded item vectors of a particular dimensionality, the inverted index includes postings lists that each correspond to a position (i.e., index) of an element of expanded item vectors. For instance, if the expanded item vectors include 1000 elements, the inverted index may include 1000 posting lists that each correspond to the position of one of the 1000 elements. Each posting list may include an identification of items that have been mapped to the posting list.

A "query" comprises any input that can be used for returning results identifying items. For instance, a query may comprise text, image, audio, video, or any combination thereof. The query could be a document, a web page, a product listing (e.g., on an e-commerce site), a movie, a song, a photograph, or any other input. In some instances, a query may comprise user information, such as user demographics or user activities (e.g., interactions with items, such as viewing, rating, etc.)

A "query vector" is an array of values providing a representation of a query. Each value in a query vector comprises an element of the query vector. In some cases, a query vector may be an embedding generated by a neural network using the query. The embedding may be a dense embedding having relatively smaller dimensionality (i.e., a smaller number of values/elements in the embedding).

An "expanded query vector" is an array of values generated by expanding a query vector, and in some instances, sparsifying the expanded query vector. In some instances, the expanded query vector may be generated by applying (i.e., multiplying) a matrix to a given query vector.

Overview

The large volume of items typically available to search systems presents various challenges, including the ability to efficiently index items and quickly return relevant results. The state of the art solution for many search systems includes use of an inverted index and matching based on term-frequency and inverse document frequency. Such systems are typically fast with <10 ms latency per query. These approaches work well for text-based items but are not as feasible for other types of items. Another conventional approach uses item representations in the form of item vectors that encode an item itself (in the case of digital content items) and/or information associated with an item (e.g., attributes of an item and/or user interactions with the item). For instance, neural network models can be used to generate dense embeddings representative of each item. While such dense embeddings often provide very informative representations of items, it is difficult for search systems to quickly identify relevant items in the embedding space when there is a large volume of items.

An existing set of works for fast near neighbor search on dense embeddings is Hierarchical Navigable Small World graph (HNSW). HNSW is a state of the art method but has a number of shortcomings. 1) HNSW cannot work with an inverted index-based search systems (e.g., the Elasticsearch engine). Many current retrieval engines rely on such systems for fast retrieval functionality and system friendliness. 2) Constraint filtering during retrieval is not possible with HNSW. However, constraint filtering is a major requirement for many product recommendation engines. 3) HNSW needs sequential true dense embedding distance computations. Hence, HNSW is not a scalable solution and leaves no scope of improvement using multithreading. 4) It is not trivial for indexing on data stream.

Embodiments of the present invention address these shortcomings of conventional search systems by a search system that provides, among other things, efficient and fast near neighbor search given item vector representations of items, regardless of item type or corpus size. In accordance with some aspects of the technology described herein, a sparse representation of an item is used to index the item in an inverted index. Given an item vector for an item, the indexing process expands the item vector to generate an expanded item vector having a dimensionality greater than the dimensionality of the item vector. The query expansion process may include hashing the item vector by applying (i.e., multiplying) a matrix to the item vector to generate the expanded item vector. Elements of the expanded item vector are selected for indexing the item in an inverted index. This may include identifying the top k values in the expanded vector. In some instances, sparsification is employed by setting the selected elements of the expanded item vector to a non-zero value while setting all other elements of the expanded item vector to zero. An identifier of the item is stored in posting lists of the inverted index based on the positions of the selected elements in the expanded item vector. More particularly, the inverted index includes posting lists corresponding with the position of each element in the expanded item vector. For instance, if the expanded item vector includes 1000 elements, the index includes 1000 posting lists.

When a query is received, a query vector of the query is generated and the query vector is expanded, for instance, by hashing the query vector using a matrix. The resulting expanded query vector has a dimensionality greater than the dimensionality of the query vector. Elements of the expanded query vector are selected. For instance, the top k values of the expanded query vector may be selected. This may include sparsifying the expanded query vector by setting the selected elements of the expanded query vector to a non-zero value and setting all other elements of the expanded query vector to zero. Candidate items are identified from the inverted index based on the positions of the selected elements in the expanded query vector. More particularly, the candidate items are selected based on item identifiers stored with each posting list corresponding to the positions of the selected elements in the expanded query vector. The candidate items may be ranked, for instance, based on frequency with which item identifiers appear in the relevant posting lists and/or a distance/similarly between query vector and item vectors for the candidate items. A result set is then returned as a response to the query.

The technology described herein provides advantages over conventional search systems. For instance, the search system described herein is capable of quickly returning relevant results, regardless of the form of items (including non-text based items) and the size of the item corpus. For instance, testing has demonstrated the ability of the technology described herein to achieve a very low (<10 ms) query latency on any corpus of size 1 M-10 M items and presents the ability to scale to large corpus sizes (e.g., hundreds of millions of items). The search system can also work in conjunction with or otherwise be easily integrated with index-based solutions, such as the Elasticsearch engine. The search system described herein also supports constraint-based filtering during the query process. The search system further supports insertion on data stream, as well as deletion of any item. The search system still further supports easy data and compute parallelism.

Example System Using Sparse Embedding Index

With reference now to the drawings, FIG. 1 is a block diagram illustrating an exemplary system 100 for generating an inverted index from sparse representations of items and performing searches using the index in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a search system 104. Each of the user device 102 and search system 104 shown in FIG. 1 can comprise one or more computer devices, such as the computing device 800 of FIG. 8, discussed below. As shown in FIG. 1, the user device 102 and the search system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the search system 104 could be provided by multiple server devices collectively providing the functionality of the search system 104 as described herein. Additionally, other components not shown may also be included within the network environment.

At a high level, the search system 104 indexes information about items in an index 110 based on sparse representations of the items, and uses the index 100 when returning results in response to queries. As shown in FIG. 1, the search index 104 includes an indexing component 120 and a querying component 130. These components may be in addition to other components that provide further additional functions beyond the features described herein.

The search system 104 can be implemented using one or more server devices, one or more platforms with corresponding application programming interfaces, cloud infrastructure, and the like. While the search system 104 is shown separate from the user device 102 in the configuration of FIG. 1, it should be understood that in other configurations, some or all of the functions of the search system 104 can be provided on the user device 102.

The indexing component 120 generally operates to index information about items in the index 110 such that the information can be leveraged to select items to return as results in response to queries. As shown in FIG. 1, the indexing component 120 includes an item expansion module 122 and an item indexing module 124. At a high level, the item expansion module 122 generates sparse representations of items that are used to map items (by the item indexing module 124) to posting lists in the index 110.

The item expansion module 122 operates on item vectors for items. In some instances, each item can comprise some form of digital content, such as any combination of text, audio, video, and image. In other instances, an item can be physical, such as a product on an e-commerce site or individual on a social networking site. An item vector for an item comprises an array of values that provides a representation of the item. For instance, the item vector may be an embedding generated by a neural network. In some instances, this may be a dense embedding with smaller dimensionality—in other words, a smaller number of values in the embedding.

Given an item vector for an item, the item expansion module 122 expands the item vector to generate an expanded item vector. The item expansion module 122 may generate the expanded item vector by applying a matrix to the item vector. In some configurations, the matrix may be a sparse binary matrix, such as a sparse random Gaussian matrix. The matrix may be randomly generated, for instance, where each element is selected from Gaussian distribution. In other instances, the matrix may be learned such that it is optimized to provide better performance.

Applying the matrix to the input vector to generate the expanded item vector provides a linear mapping from a lower dimensional space in the input vector to a higher dimensional space in the expanded item vector. As such, the expanded item vector has a dimensionality that is greater than the dimensionality of the item vector.

The item expansion module 122 also selects the top k values from the expanded item vector for providing a sparse representation of the item. In particular, the positions in the expanded item vector corresponding to the top k values are used as a sparse representation of the item. In some configurations, the top k values are selected by sorting (ranking) the values in the expanded item vector, followed by picking the locations of highest k values. In some instances, the item expansion module 122 sparsifies the expanded item vector to provide the sparse representation of the item. Sparsification may include identifying the top k values in the expanded item vector, setting those elements to a non-zero value, and setting other elements in the expanded item vector to zero.

Figure 2:
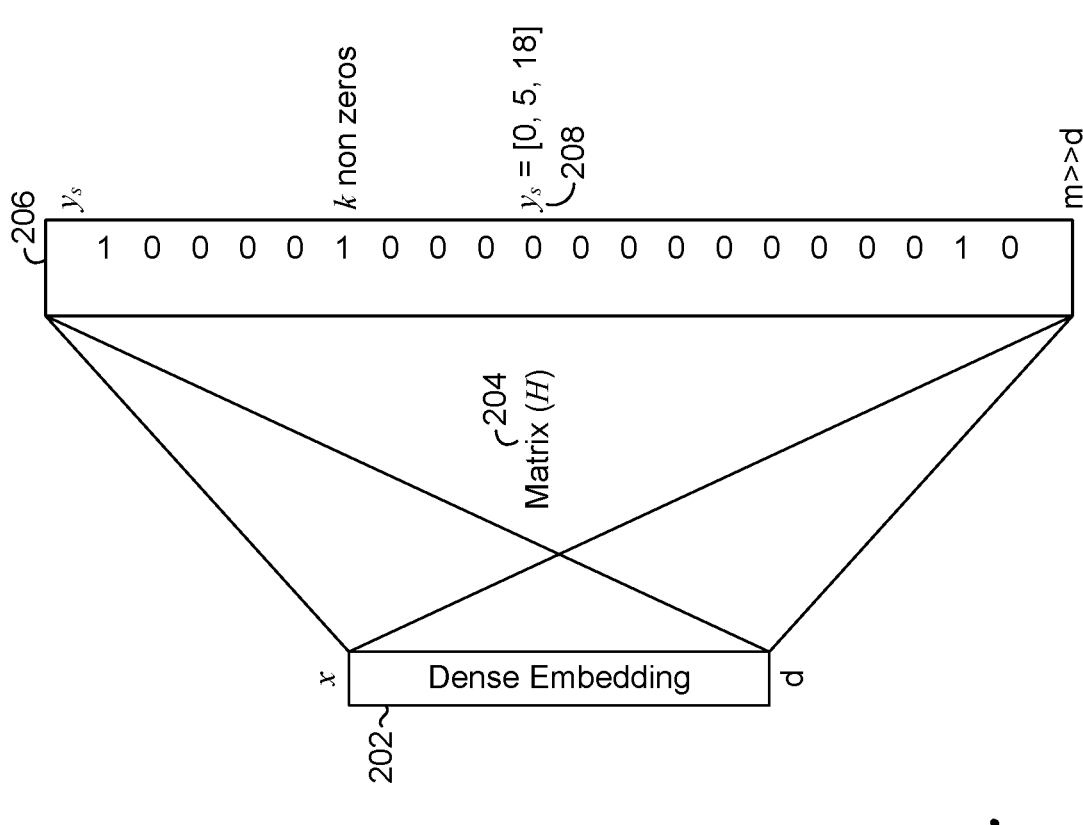
FIG. 2 is a diagram showing generation of a sparse representation of an item in accordance with some implementations of the present disclosure.

FIG. 2 provides an example of the expansion process. As shown in FIG. 2, an input vector x 202 is a dense embedding of dimensionality d. Expansion is performed by applying a matrix H 204 to the input vector x 202. Sparsification is also performed to identify the top k values in the expanded item vector, set those elements to a non-zero value, and set other elements to zero. This process provides an expanded item vector $y_s$ 206 with a dimensionality m that is much greater than the dimensionality d of the input vector x 202. In the example shown in FIG. 2, the expanded item vector $y_s$ 206 includes three non-zero values (i.e., k=3), while all other elements have been set to zero. The non-zero values correspond to the $0^{th}$, $5^{th}$, and $18^{th}$ positions in the expanded item vector $y_s$ 206. A sparse representation 208 of the item identifies these positions.

Returning to FIG. 1, the positions in the expanded item vector corresponding to the top k values are used by the item indexing module 124 to index the item in the index 110. In accordance with some aspects of the technology described herein, the index 110 includes a number of posting lists in which east posting list corresponds to a position of an element in expanded item vectors. As an example to illustrate, if expanded item vectors include 1000 elements, the index 110 includes 1000 posting lists, each of which corresponds to one of the 1000 elements. For instance, a first posting list corresponds with the $0^{th}$ position in the expanded item vectors, a second posting list corresponds with the $1^{st}$ position in the expanded item vectors, a third posting list corresponds with the $2^{nd}$ position in the expanded item vectors, etc. Given the positions of the selected k values from the expanded item vector for the item, the item indexing module 124 identifies the posting lists in the index 110 corresponding to those positions and stores an identifier of the item in each of the identified posting lists.

Figure 3:
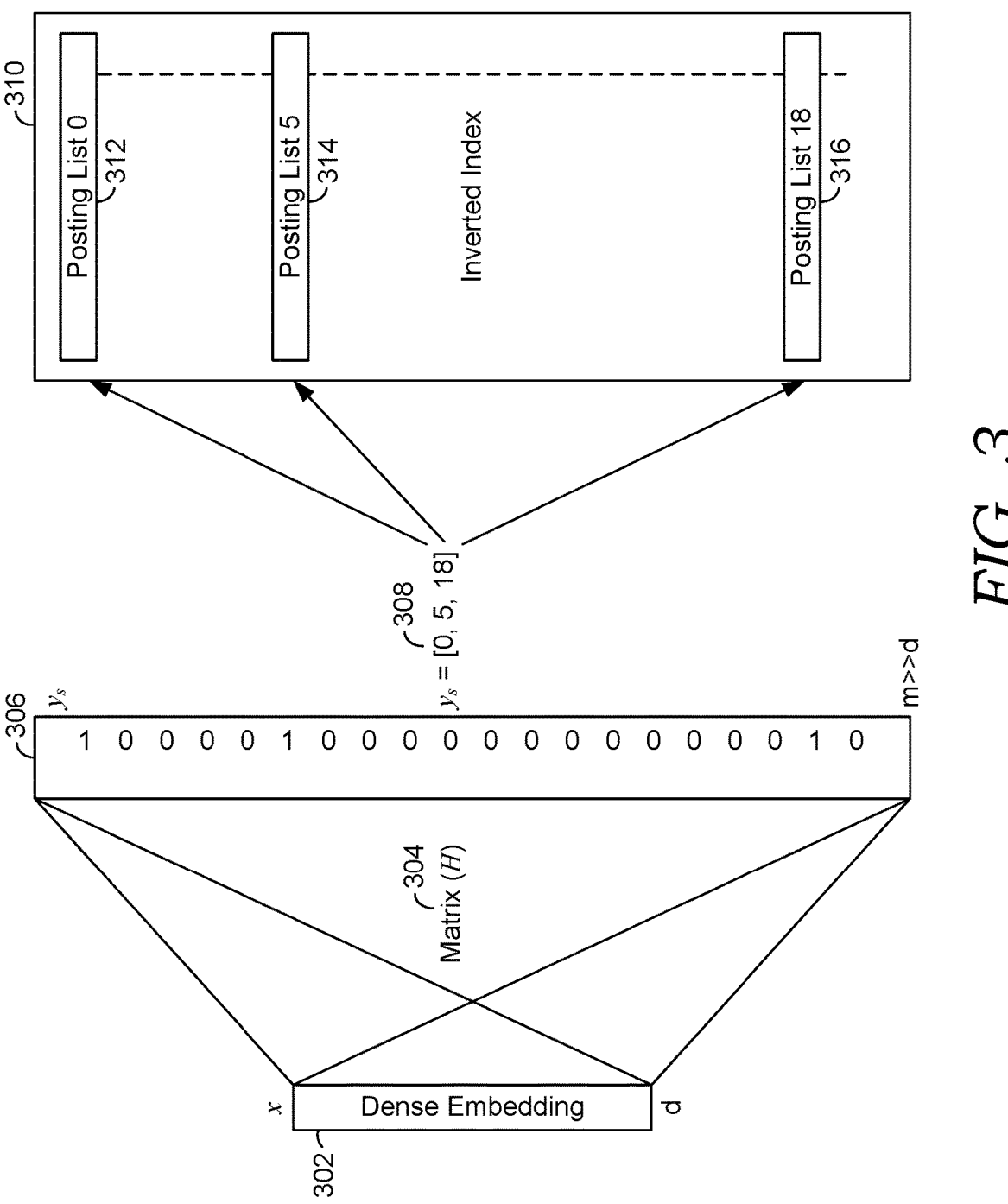
FIG. 3 is a diagram showing use of a sparse representation of an item to map the item to posting lists in an inverted index in accordance with some implementations of the present disclosure.

FIG. 3 provides an example of the indexing process. As shown in FIG. 3, an expanded item vector $y_s$ 306 has been generated via expansion (i.e., expanding an item vector x 302 using matrix H 304) and sparsification (e.g., via the item expansion module 122), thereby providing a sparse representation 308 of the item. In the example of FIG. 3, the sparse representation 308 of the item indicates that selected values from the expanded item vector $y_s$ 306 correspond to the $0^{th}$, $5^{th}$, and $18^{th}$ positions from the expanded item vector $y_s$ 306. Given this, the item indexing module 124 identifies posting lists 312, 314, 316 in the inverted index 310. In particular, posting list 312 corresponds to the $0^{th}$ position in expanded item vectors, posting list 314 corresponds with the $5^{th}$ position in expanded item vectors, and posting list 316 corresponds with the $18^{th}$ position in expanded item vectors. The item indexing module stores an identifier of the item in each of these posting lists 312, 314, 316.

Turning again to FIG. 1, the search system 104 also includes a querying component 130 to facilitate returning results to queries. As shown in FIG. 1, the querying component 130 includes a query expansion module 132, a querying module 134, and a UI module 136, each of which will be described in further detail below.

Given a query received by the search system 104, the query expansion module 132 generates a spares representation of the query that can be used to search the index 110. A query can comprise any digital input and can include any combination of text, image, audio, and video. In some instances, a query can additionally or alternatively include information regarding a user associated with the query. The query may be received from a user device, such as user device 102, or from another source, such as a third-party server. A query vector is generated for the query. The query vector is an array of values that provides a representation of the query. For instance, the query vector may be an embedding generated by a neural network. In some instances, this may be a dense embedding with smaller dimensionality—in other words, a smaller number of values in the embedding.

The query expansion module 132 expands the query vector to generate an expanded query vector. The query expansion module 132 may generate the expanded query vector by applying a matrix to the query vector. In some configurations, the matrix may be a sparse binary matrix, such as a sparse random Gaussian matrix. The matrix may be randomly generated, for instance, where each element is selected from Gaussian distribution. In other instances, the matrix may be learned such that it is optimized to provide better performance. The matrix used by the query expansion module 132 for query expansion may comprise the same matrix used by the item expansion module 122 for item expansion.

Applying the matrix to the query vector to generate the expanded query vector provides a linear mapping from a lower dimensional space in the query vector to a higher dimensional space in the expanded query vector. As such, the expanded query vector has a dimensionality that is greater than the dimensionality of the query vector.

The query expansion module 132 also selects the top k values from the expanded query vector for providing a sparse representation of the query. In particular, the positions in the expanded query vector corresponding to the top k values are used as a sparse representation of the query. In some instances, the query expansion module 132 sparsifies the expanded query vector to provide the sparse representation of the item. Sparsification may include identifying the top k values in the expanded query vector, setting those elements to a non-zero value, and setting other elements in the expanded query vector to zero.

The querying module 134 uses the sparse representation of the query to search the index 110. As described above, the sparse representation of the query identifies the positions of selected elements from the expanded query vector. The querying module 134 uses those positions to select items with identifiers stored in the posting lists corresponding with those positions. The querying module 134 may select items based on the frequency with which item identifiers are included in each posting list. For instance, if the sparse representation of the query identifies three positions in the expanded query vector, the querying module 134 can be configured to identify only items with identifiers appearing in all three posting lists corresponding to those three positions or items with identifiers appearing in a subset of the three postings lists (e.g., appearing two posting lists or one posting list). In some configurations, the querying module 134 can be configured such that the threshold can be varied. For instance, the querying module 134 may first select items having identifiers in all three posting lists. If the number of items identified doesn't satisfy a threshold, the querying module 134 may select additional items having identifiers in any two of the posting lists. If the number of items identified at that point still doesn't satisfy a threshold, the querying module 134 may select further items having identifiers in any of the posting lists.

Items identified from the index 110 by the querying module 134 may be further ranked before returning a result identifying the items as a response to the query. The querying module 134 may employ any number of different techniques to rank the items. In some instances, the items may be ranked based on the frequency with which they appear in the posting lists queried by the querying module 134. For instance, items appearing in all three posting lists could be ranked first, items appearing in two posting lists could be ranked next, and items appearing in only one posting list could be ranked last. In other configurations, items may be ranked using the original item vectors for the items and the query vector for the query. In particular, each item can be ranked based on a calculation of the distance/similarity (e.g., cosine similarity) of each item vector to the query vector. For instance, the item vectors and query vector may be dense embeddings from a neural network, and rankings can be determined based on a distance between the item vectors and query vector in the embedding space.

Figure 4:
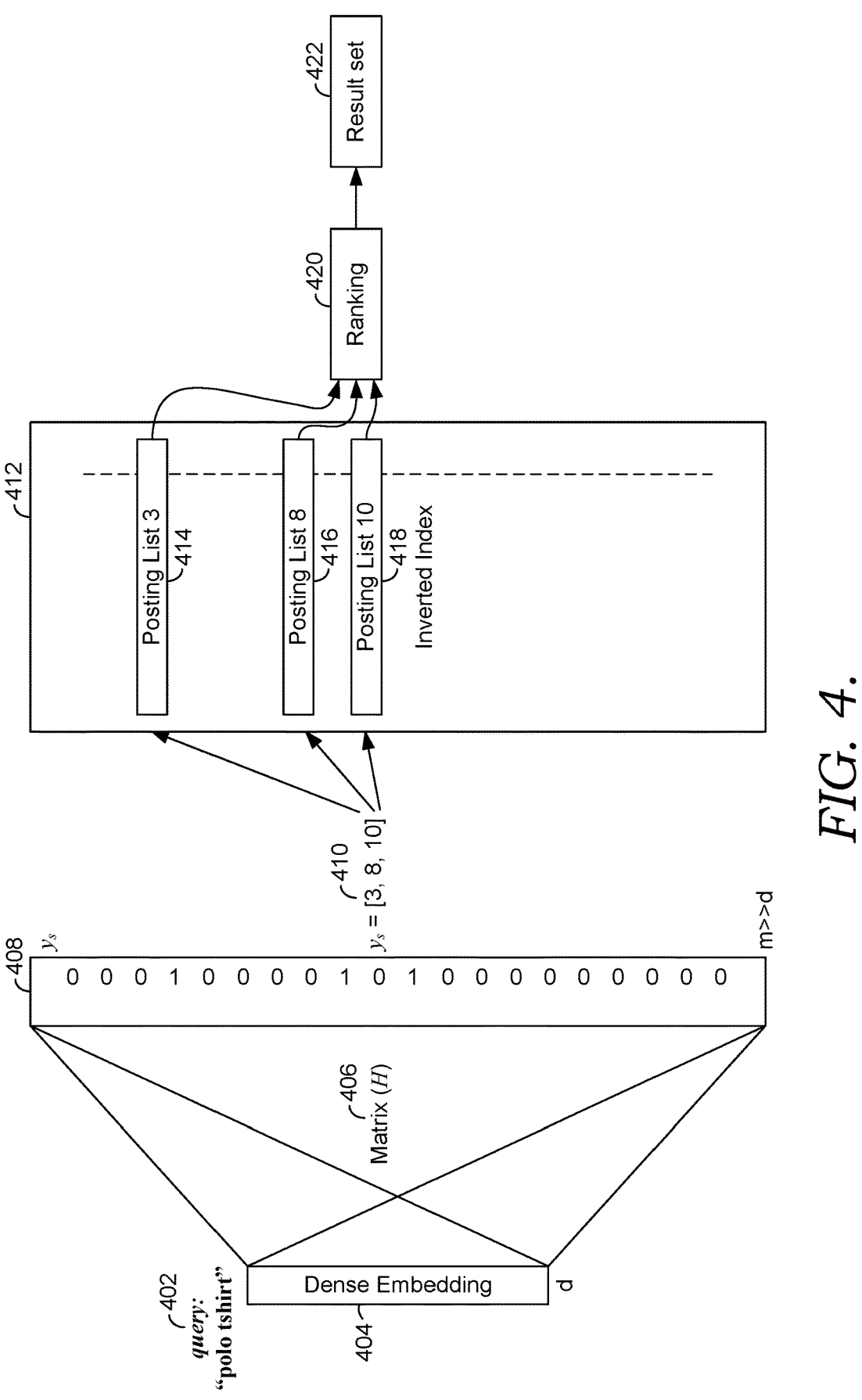
FIG. 4 is a diagram showing generation of an expanded query vector and using the expanded query vector to identify items to return as results in accordance with some implementations of the present disclosure.

FIG. 4 provides an example of the querying process. As shown in FIG. 4, a query vector 404 of a query 402 ("polo tshirt") is received. The query vector 404 may comprise, for instance, a dense embedding from a neural network. An expanded query vector $y_s$ 408 is generated via expansion (i.e., applying matrix H 406 to query vector 404) and sparsification. Based on this process, a sparse representation 410 is provided identifying the positions of k selected elements in the expanded query vector $y_s$ 408. In the present example, three positions have been identified (i.e., k=3)— the $3^{rd}$, $8^{th}$, and $10^{th}$ positions. Given this, the posting lists 414, 416, 418 corresponding with the $3^{rd}$, $8^{th}$, and $10^{th}$ positions, respectively are accessed to identify items with identifiers stored in each of the posting lists 414, 416, 418. This provides an initial set of items. As indicated above, the items may be selected based on a frequency with which identifiers for the items appear in the three posting lists 414, 416, 418. Ranking 420 of the items identified from the inverted index 412 is performed to provide a result set 422, identifying the ranked items. As noted above, the ranking 420 can be based on a number of different approaches, such as the frequency with which items appear in the three posting lists and/or a measurement of distance/similarity between the query vector and item vectors of the items identified from the inverted index.

In some configurations, the querying component 130 can employ additional constraints in conjunction with a query vector. For instance, in the context of a product listing site, additional constraints could be based on product attributes, such as size and color, for instance. To facilitate the use of additional constraints, the index 110 may include additional posting lists beyond the posting lists for the sparse representation of items. Each additional posting list may correspond to a constraint and store identifiers for items matching the constraint. When a query is received that includes both a query vector and a constraint, the querying component identifies items from the index 110 from posting listings based on a sparse representation of the query and the posting list for the constraint. Any number of constraints can be used in conjunction with a query vector.

Figure 5:
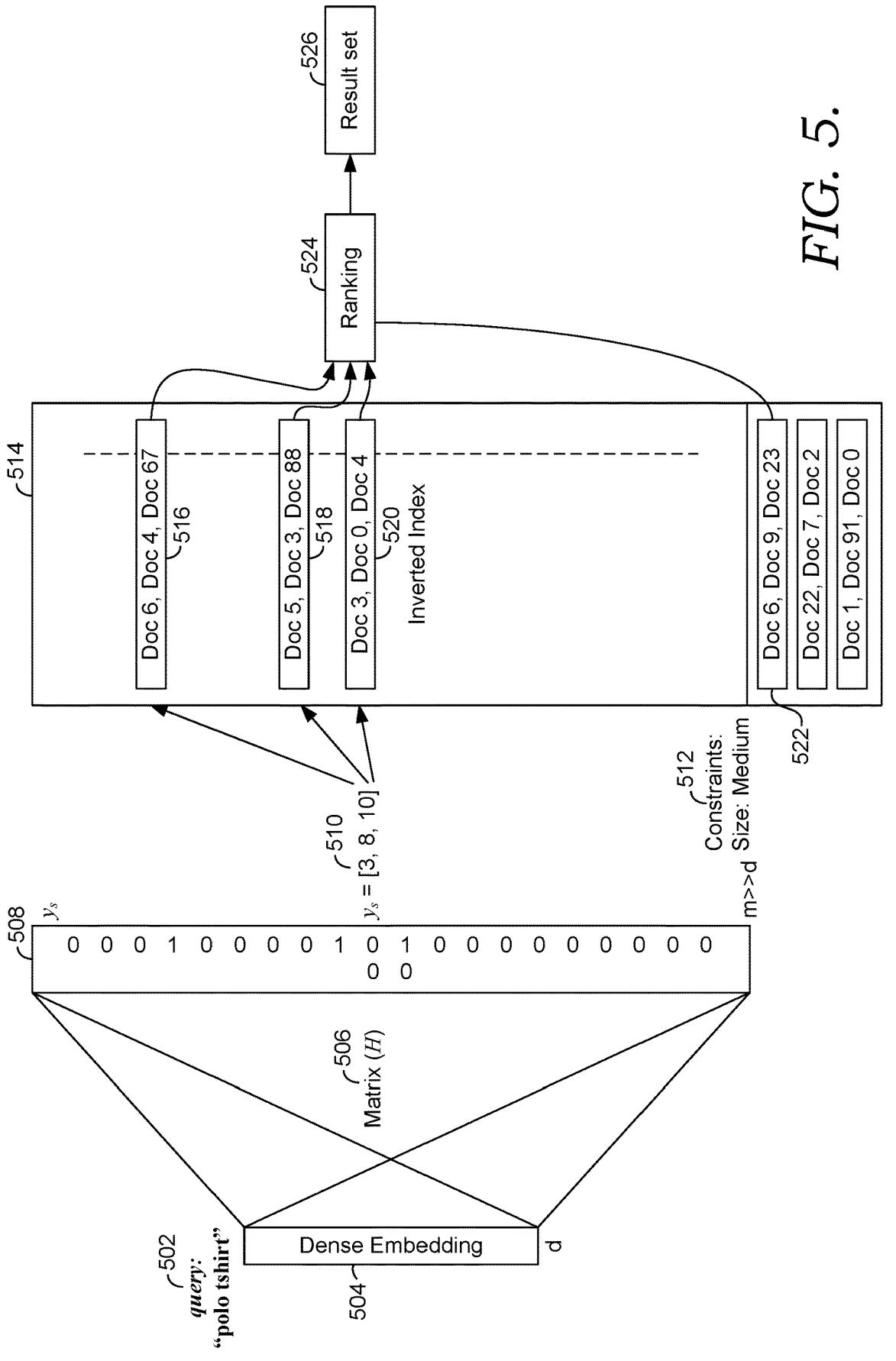
FIG. 5 is a diagram showing use of a constraint with an expanded query vector to identify items to return as results in accordance with some implementations of the present disclosure.

FIG. 5 provides an example of the query process using an additional constrain. As shown in FIG. 5, a query vector 504 of a query 502 ("polo tshirt") is received. The query vector 504 may comprise, for instance, a dense embedding from a neural network. In addition, a constraint 512 ("size=medium") is received. An expanded query vector $y_s$ 508 is generated via expansion (i.e., applying matrix H 506 to query vector 504) and sparsification. Based on this process, a sparse representation 510 is provided identifying the positions of k selected elements in the expanded query vector $y_s$ 508. In the present example, three positions have been identified (i.e., k=3)—the 3rd, 8th, and 10th positions. Given this, the posting lists 516, 518, 520 corresponding with the 3rd, 8th, and 10th positions, respectively, are accessed to identify items with identifiers stored in each of the posting lists posting lists 516, 518, 520. Additionally, a posting list 522 corresponding with the constraint 512 is accessed to identify items with identifiers stored in the posting list 522. Based on the identifiers in posting lists 516, 518, 520, 522, a set of items is provided. As discussed previously, the items may be selected based on a frequency with which identifiers for the items appear in the posting lists 516, 518, 520, 522. Ranking 524 of the items identified from the inverted index 514 is performed to provide a result set 526, identifying the ranked items. The ranking 524 can be based on a number of different approaches, such as the frequency with which items appear in the four posting lists and/or a measurement of distance/similarity between the query vector and item vectors of the items identified from the inverted index. In some cases, the rankings may be weighted based on posting lists. For instance, items found in the posting list 522 may be given higher weighting. In some cases, the constraint may operate as a filter, such that items with identifiers not included in the posting list 522 are filtered from further consideration.

Referring again to FIG. 1, the user interface (UI) module 136 of the query component system 130 provides a user interface for interacting with the search system 130. For instance, the UI module 136 can provide user interfaces for receiving input, such as a query, and providing output, such as the results in response to a query. For instance, the UI module 136 can provide a UI to a user device, such as the user device 102. The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the visual search system 104. The application 108 can be, for instance, a web browser or a dedicated application for providing searching functions, such as those described herein. The application 108 can present the UI provided by the UI module 136.

Example Methods for Generating and Searching a Sparse Embedding Index

With reference now to FIG. 6, a flow diagram is provided that illustrates a method 600 for indexing an item by generating a sparse representation of the item that facilitates mapping the item to posting lists in an inverted index. The method 600 may be performed, for instance, by the indexing component 120 of the search system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, an item vector for an item is received. In some instances, the item may comprise any digital content, including any combination of text, image, audio, and video. In other instances, the item may be physical, such as a product on an e-commerce site or an individual on a social networking site. The item vector may be generated from the item itself or portions thereof (in the case of digital content) and/or information associated with the item (e.g., attributes of the item and/or information regarding user interaction with the item). In some instances, the item vector may be a dense embedding generated by a neural network.

The item vector is expanded to generate an expanded item vector, as shown at block 604. This may include hashing the item vector by applying a matrix to the item vector. The resulting expanded item vector has a dimensionality greater than the dimensionality of the item vector.

Elements of the expanded item vector are selected for the purpose of indexing the item, as shown at block 606. In some instances, this may include identifying the top k values in the expanded item vector. This may include sparsifying the expanded item vector by setting the elements of the expanded item vector corresponding to the top k values to a non-zero value and setting all other elements of the expanded item vector to zero.

An identifier of the item is stored in posting lists of an inverted index, as shown at block 608. The inverted index includes posting lists corresponding with the position of each element in the expanded item vector. For instance, if the expanded item vector includes 1000 elements, the index includes 1000 posting lists. The identifier of the item is stored in the posting lists corresponding to the positions of the selected elements (e.g., the top k values) in the expanded item vector. For instance, if the selected elements are the $13^{th}$, $15^{th}$, and $17^{th}$ positions of the expanded item vector, the identifier of the item would be stored in the posting lists corresponding to those positions.

Turning next to FIG. 7, a flow diagram is provided that illustrates a method 700 for using a sparse representation of a query to identify items in an inverted index to return as results. The method 700 may be performed, for instance, by the querying component 130 of the search system 104 of FIG. 1. As shown at block 702, a query vector is received. The query vector may comprise, for instance, a dense embedding generated from a query by a neural network. The query is expanded to generate an expanded query vector, as shown at block 704. This may include hashing the query vector by applying a matrix to the query vector. The resulting expanded query vector has a dimensionality greater than the dimensionality of the item vector.

Elements of the expanded query vector are selected for the purpose of searching the inverted index, as shown at block 706. In some instances, this may include identifying the top k values in the expanded query vector. This may include sparsifying the expanded query vector by setting the elements of the expanded query vector corresponding to the top k values to a non-zero value and setting all other elements of the expanded query vector to zero.

Candidate items are identified from the inverted index based on the positions of the selected elements in the expanded query vector, as shown at block 708. In particular, the posting lists corresponding to the positions of the selected elements in the expanded query vector are accessed to identify identifiers of items stored with each of the posting lists. For instance, if the selected elements correspond to the $13^{th}$, $15^{th}$, and $17^{th}$ positions of the expanded query vector, the posting lists corresponding to those positions would be accessed. In some instances, the candidate items may be selected based on frequency with which identifiers of the items appear in each of those posting lists.

The candidate items are ranked, as shown at block 710. The candidate items may be ranked in a number of different manners in accordance with various aspects of the technology disclosed herein. For instance, each candidate item may be ranked based on a frequency with which the identifier for each candidate item appears in the relevant posting lists. As another example, each candidate item may be ranked by determining a distance/similarity between the query vector and an item vector for the candidate item. Results are returned based on the ranked items, as shown at block 712.

Exemplary Operating Environment

Figure 8:
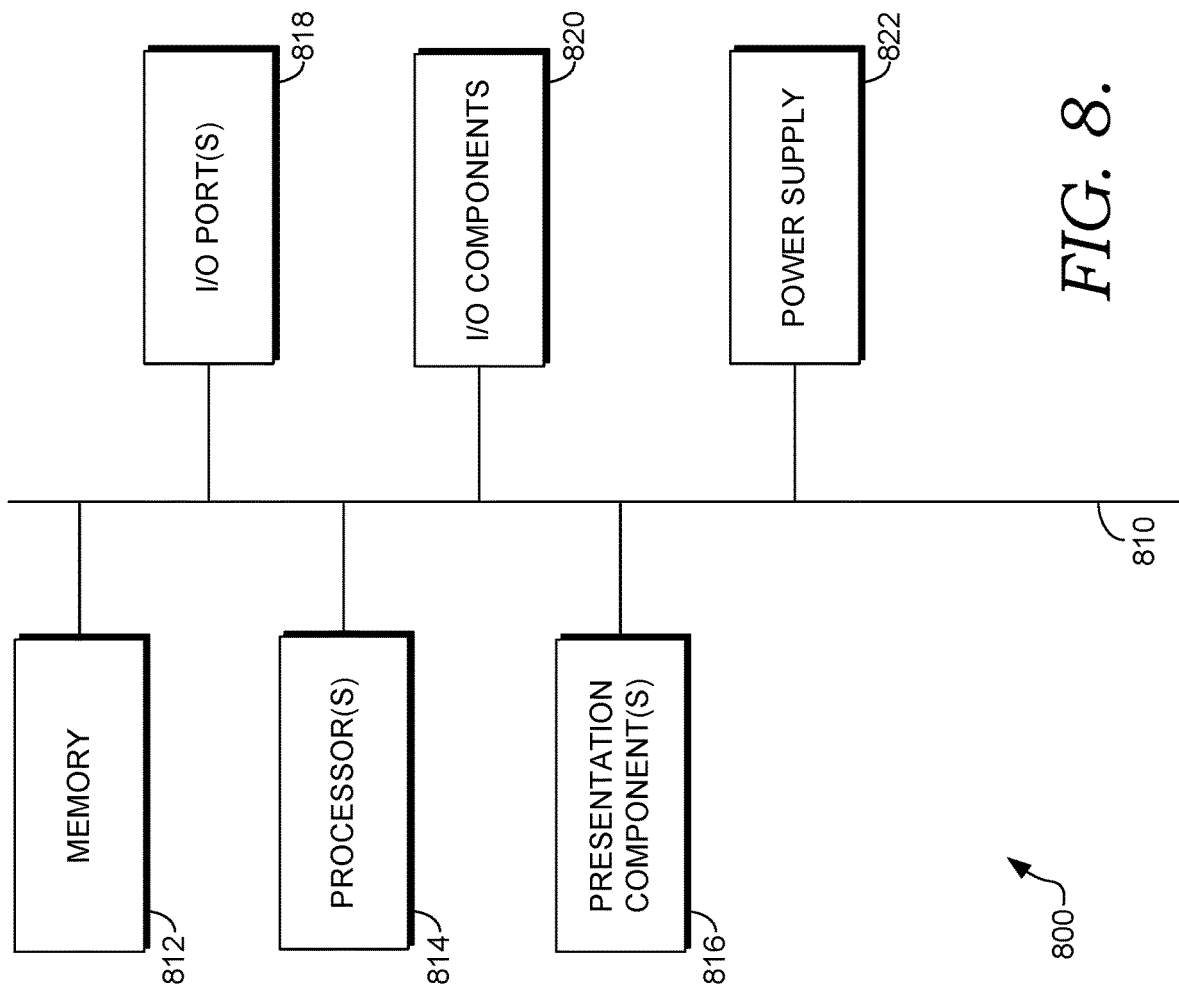
FIG. 8 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

Aspects of the present invention have been described in relation to particular embodiments, which are intended in all respects to be illustrative rather than restrictive. Alternative embodiments will become apparent to those of ordinary skill in the art to which the present invention pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

providing a plurality of expanded item vectors for a plurality of items, wherein each expanded item vector from the plurality of expanded item vectors represents a corresponding item from the plurality of items as a corresponding array of N elements;

providing an inverted index having a plurality of posting lists, the plurality of posting lists including N posting lists, wherein the N posting lists have a one-to-one correspondence with array positions of the N elements in the plurality of expanded item vectors including a first posting list for a first array position and a second posting list for a second array position, wherein each of the N posting lists stores item identifiers for one or more items from the plurality of items based on selected elements in each expanded item vector;

expanding an item vector representing a first item not in the plurality of items to generate a first expanded item vector representing the first item as a first array of N elements;

selecting a first element at the first array position in the first expanded item vector and a second element at the second array position in the first expanded item vector;

based on selecting the first element at the first array position in the expanded item vector and the second element at the second array position in the first expanded item vector:

identifying, from the N posting lists, the first posting list for the first array position and the second posting list for the second array position, storing an item identifier for the first item in the first posting list for the first array position, the first posting list also including an item identifier for each of one or more items from the plurality of items, and storing the item identifier for the first item in the second posting list for the second array position, the second posting list also including an item identifier for each of one or more items from the plurality of items.

2. The computer storage media of claim 1, wherein expanding the item vector to generate the first expanded item vector comprises multiplying a matrix to the item vector, wherein the matrix comprises a sparse random binary matrix.

3. The computer storage media of claim 1, wherein the item vector comprises an embedding generated by a neural network using an input data regarding the first item.

4. The computer storage media of claim 1, wherein selecting the first element of the first expanded item vector and the second element of the first expanded item vector comprises sparsifying the first expanded item vector.

5. The computer storage media of claim 4, wherein sparsifying the first expanded item vector comprises:

setting one or more elements of the first expanded item vector to a non-zero value; and setting a value of one or more other elements of the first expanded item vector to zero.

6. The computer storage media of claim 1, wherein operations further comprise:

expanding a query vector representing a query to generate an expanded query vector comprising a second array of N elements;

selecting a first element at the first array position of the expanded query vector and a second element at the second array position of the expanded query vector; and based on selecting the first element at the first array position of the expanded query vector and the second element at the second array position of the expanded query vector:

identifying from the N posting lists from the inverted index, the first posting list for the first array position and the second posting list for the second array position, accessing a first set of item identifiers from the first posting list and a second set of item identifiers from the second posting list, and determining a plurality of items using the first set of item identifiers and the second set of item identifiers.

7. The computer storage media of claim 6, wherein selecting the first element of the expanded query vector and the second element of the expanded query vector comprises sparsifying the expanded query vector.

8. The computer storage media of claim 7, wherein sparsifying the expanded query vector comprises:

setting one or more elements of the expanded query vector to a non-zero value; and setting a value of one or more other elements of the expanded query vector to zero.

9. The computer storage media of claim 6, wherein operations further comprise:

ranking each item from the plurality of items based on a comparison of a corresponding item vector representing each item from the plurality of items and the query vector; and providing an output based on ranking the plurality of items.

10. The computer storage media of claim 1, wherein the operations further comprise:

determining an attribute of the first item;

identifying, from the plurality of posting lists in the inverted index, a third posting list for the attribute, wherein the third posting list is not in the N posting lists, wherein the third posting list stores an item identifier for one or more items from the plurality of items that have the attribute; and storing the item identifier for the first item in the third posting list.

11. A computerized method comprising:

expanding a query vector representing a query to generate an expanded query vector comprising an array of N elements, wherein each of the N elements in the expanded query vector has an array position in the expanded query vector;

selecting a first element at a first array position in the expanded query vector and a second element at a second array position in the expanded query vector;

based on selecting the first element at the first array position of the expanded query vector and the second element at the second array position of the expanded query vector:

accessing an inverted index having a plurality of posting lists, the plurality of posting lists including N positing lists, wherein the N posting lists have a one-to-one correspondence with the array positions of the N elements in the expanded query vector including a first posting list for the first array position and a second posting list for the second array position, wherein each of the N posting lists stores item identifiers for one or more items from a plurality of items, identifying, from the N posting lists in the inverted index, the first posting list for the first array position and the second posting list for the second array position, accessing a first set of item identifiers from the first posting list and a second set of item identifiers from the second posting list, and determining a plurality of items using the first set of item identifiers and the second set of item identifiers.

12. The computerized method of claim 11, wherein selecting the first element at the first array position in the expanded query vector and the second element at the second array position in the expanded query vector comprises sparsifying the expanded query vector.

13. The computerized method of claim 12, wherein sparsifying the expanded query vector comprises:

setting one or more elements of the expanded query vector to a non-zero value; and setting a value of one or more other elements of the expanded query vector to zero.

14. The computerized method of claim 11, wherein the method further comprises:

ranking each item from the plurality of items based on a comparison of a corresponding item vector representing each item and the query vector; and providing an output based on ranking the plurality of items.

15. A computer system comprising:

a processor; and one or more computer storage media storing computer-useable instructions that, when used by the processor, causes the computer system to perform operations comprising:

expanding, by an item expansion module, an item vector for an item to generate an expanded item vector comprising a first array of N elements, the N elements having array positions in the expanded item vector, wherein a subset of the N elements in the expanded item vector comprise selected elements including a first element at a first array position in the expanded item vector and a second element at a second array position in the expanded item vector;

storing, by an item indexing module, an item identifier of the item in each of a subset of a plurality of posting lists of an inverted index based on the selected elements in the expanded item vector, the plurality of posting lists including N positing lists having a one-to-one correspondence to the array positions in the expanded item vector, wherein the item identifier is stored in a first posting list for the first array position and in a second posting list for the second array position;

expanding, by a query expansion module, a query vector representing a query to generate an expanded query vector comprising a second array of N elements; and determining, by a querying module, a plurality of candidate items identified in at least a portion of the N posting lists corresponding with one or more array positions of one or more selected elements in the expanded query vector.

16. The computer system of claim 15, wherein the item expansion module expands the item vector to generate the expanded item vector by multiplying a matrix to the item vector.

17. The computer system of claim 15, wherein the item vector comprises an embedding generated by a neural network using an input data regarding the item.

18. The computer system of claim 15, wherein the item expansion module selects the selected elements of the expanded item vector by sparsifying the expanded item vector by setting one or more elements of the expanded item vector to a non-zero value and setting a value of one or more other elements of the expanded item vector to zero.

19. The computer system of claim 15, wherein the query expansion module selects the selected elements of the expanded query vector by: sparsifying the expanded query vector by setting the selected elements of the expanded query vector to a non-zero value and setting a value of one or more other elements of the expanded query vector to zero.

20. The computer system of claim 15, wherein the querying module ranks each candidate item based on a comparison of a corresponding item vector representing each candidate item and the query vector, and provides an output based on ranking the candidate items.

* * * * *